Sept. 29, 1925.  R. F. THWEATT  1,555,038
ADJUSTABLE AUTOMOBILE TABLE
Original Filed June 13, 1924
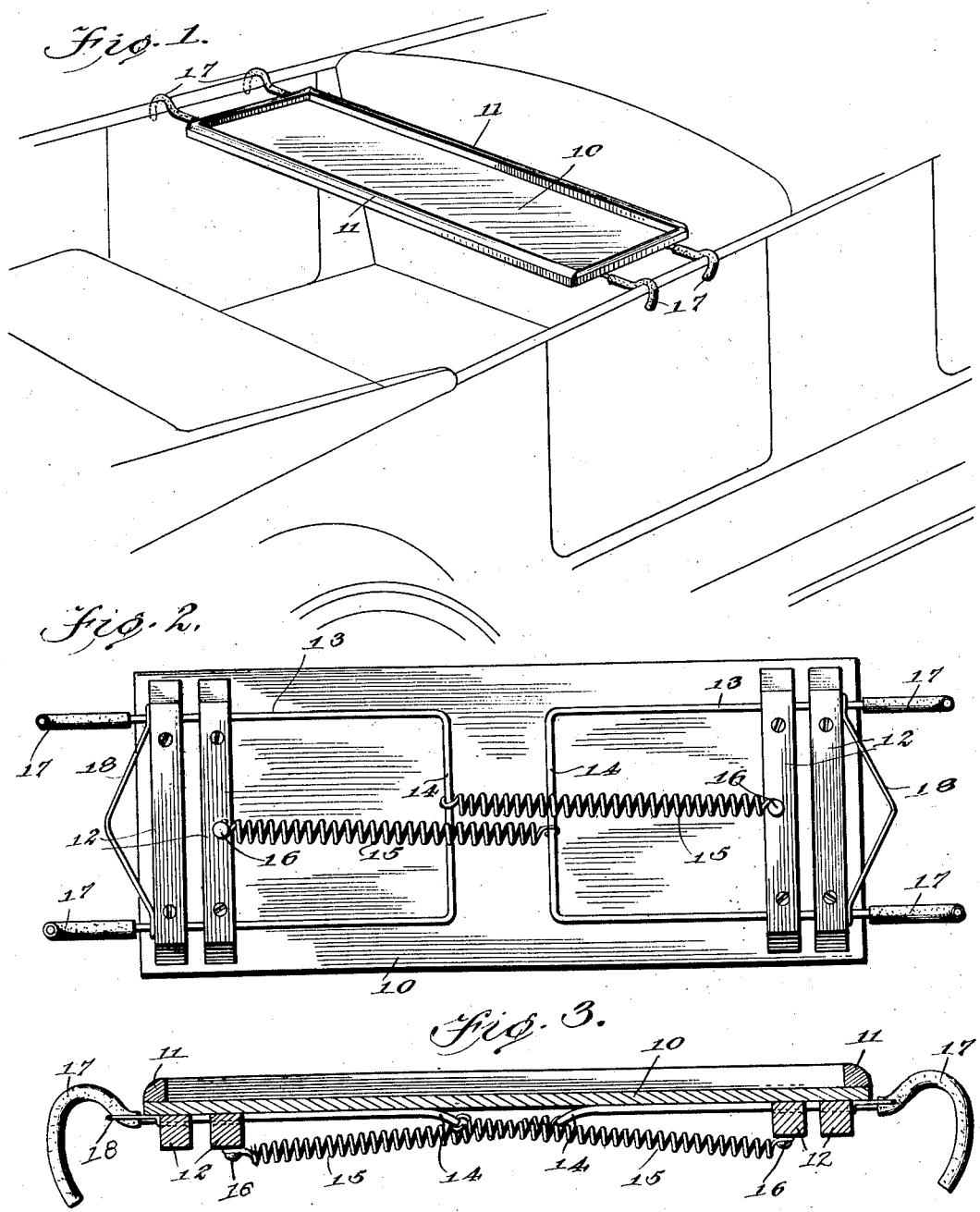

Patented Sept. 29, 1925.

1,555,038

UNITED STATES PATENT OFFICE.

RICHMOND F. THWEATT, OF CHICKASHA, OKLAHOMA.

ADJUSTABLE AUTOMOBILE TABLE.

Application filed June 13, 1924, Serial No. 719,847. Renewed June 2, 1925.

*To all whom it may concern:*

Be it known that I, RICHMOND F. THWEATT, a citizen of the United States, and a resident of Chickasha, in the county of Grady and State of Oklahoma, have invented certain new and useful Improvements in Adjustable Automobile Tables, of which the following is a specification.

My present invention relates generally to tables for use in connection with automobiles and more especially to a table adapted to be extended across the space within an automobile and to effectively engage the automobile sides in supporting relation, my object being the provision of an adjustable table of this character which may be made strong and durable and at the same time light in weight so that it may be readily handled.

Generally speaking my invention contemplates a table for application to automobiles which is especially useful in connection with soda fountains, soft drink stores and the like to accommodate customers in automobiles, to the end that several patrons may be served in a proper manner while seated in their automobile.

In the accompanying drawing which illustrates my present invention and forms a part of this specification, Figure 1 is a perspective view illustrating the practical application of my invention, Figure 2 is a bottom plan view of my improved table, and Figure 3 is a longitudinal section taken therethrough.

Referring now to these figures and particularly to Figures 2 and 3 my invention proposes an elongated rectangular tray 10 which with the supports thereby constitutes the table and the upper surface of which may or may not have a surounding rim 11 as desired.

Across the lower surface of the tray 10 adjacent to its opposite ends are transverse bearing cleats 12 through which the side extensions 13 of a pair of U-shaped clamps 14 are freely slidable. The inner cross bars of these U-shaped clamps 14 are disposed adjacent to one another in the normal position and bent slightly away from the lower surface of the tray 10 so as to provide for the effective engagement of the inner ends of crossing coil springs 15 therewith. The outer ends of these springs are anchored as at 16 in connection with the central portions of certain of the cleats 12.

The outer ends of the extensions 13 of the U-shaped clamps, projecting beyond the ends of the tray 10 are curved and then turned to form engaging members for engagement with the upper edges of the automobile sides, with the tray extended across the space between the automobile sides as indicated in Figure 1, these engaging portions of the clamping members being preferably provided with tubular protecting sleeves 17 useful to avoid marring varnish finish of the automobile in connection with which the tray or table is used.

Outwardly beyond the cleats 12 the extensions 13 of each of the clamping members 14 are connected by cross bars 18 which are preferably bent so as to protrude at their central portions beyond the ends of the tray 10 whereby to form handles by means of which the clamping members may be readily drawn lengthwise with respect to and beyond the tray ends for effective engagement with the automobile sides without grasping the engaging ends of the clamps and thus without risking the pinching of the fingers.

It is obvious from the foregoing that my improved tray or table is well adapted to serve the purposes and functions first above outlined, will be strong, light in weight, durable, and may be easily placed in and removed from operative position in connection with an automobile.

I claim:

1. An adjustable automobile table including a rectangular elongated tray having supporting cross cleats upon its lower surface adjacent to its opposite ends, U-shaped clamping members the extensions of which are movable through said cleats and having outer downturned engaging ends, springs extending between the cleats and the inner portions of said clamps for drawing the clamps inwardly, and cross bars between the extensions of the clamps outwardly beyond the said cleats having portions thereof projecting beyond the ends of the tray and forming handles.

2. An adjustable automobile table including a tray having guide members upon its lower surface adjacent to its opposite ends forming braces for the tray, a pair of U-shaped clamps below the tray, the extensions of which are slidable through said guides and provided with outer downturned engaging ends beyond the ends of the tray, and springs anchored to said guide members and to the inner portions of the U-shaped clamps for normally drawing the same inwardly as described.

3. An adjustable automobile table including a rectangular elongated tray having guide members upon its lower surface adjacent to its opposite ends forming braces for the tray, a pair of U-shaped clamps below the tray, the extensions of which are slidable through said guides and provided with outer downturned engaging ends beyond the ends of the tray, springs anchored to said guide members and to the inner portions of the U-shaped clamps for normally drawing the same inwardly, and means to limit inward movement of the said clamping members, said means also forming handles whereby the clamping members may be drawn outwardly without grasping the engaging ends of the said extension.

RICHMOND F. THWEATT.